May 12, 1953
H. W. HAPMAN
BUCKET CONVEYER
2,638,205
Original Filed March 18, 1944
3 Sheets-Sheet 1
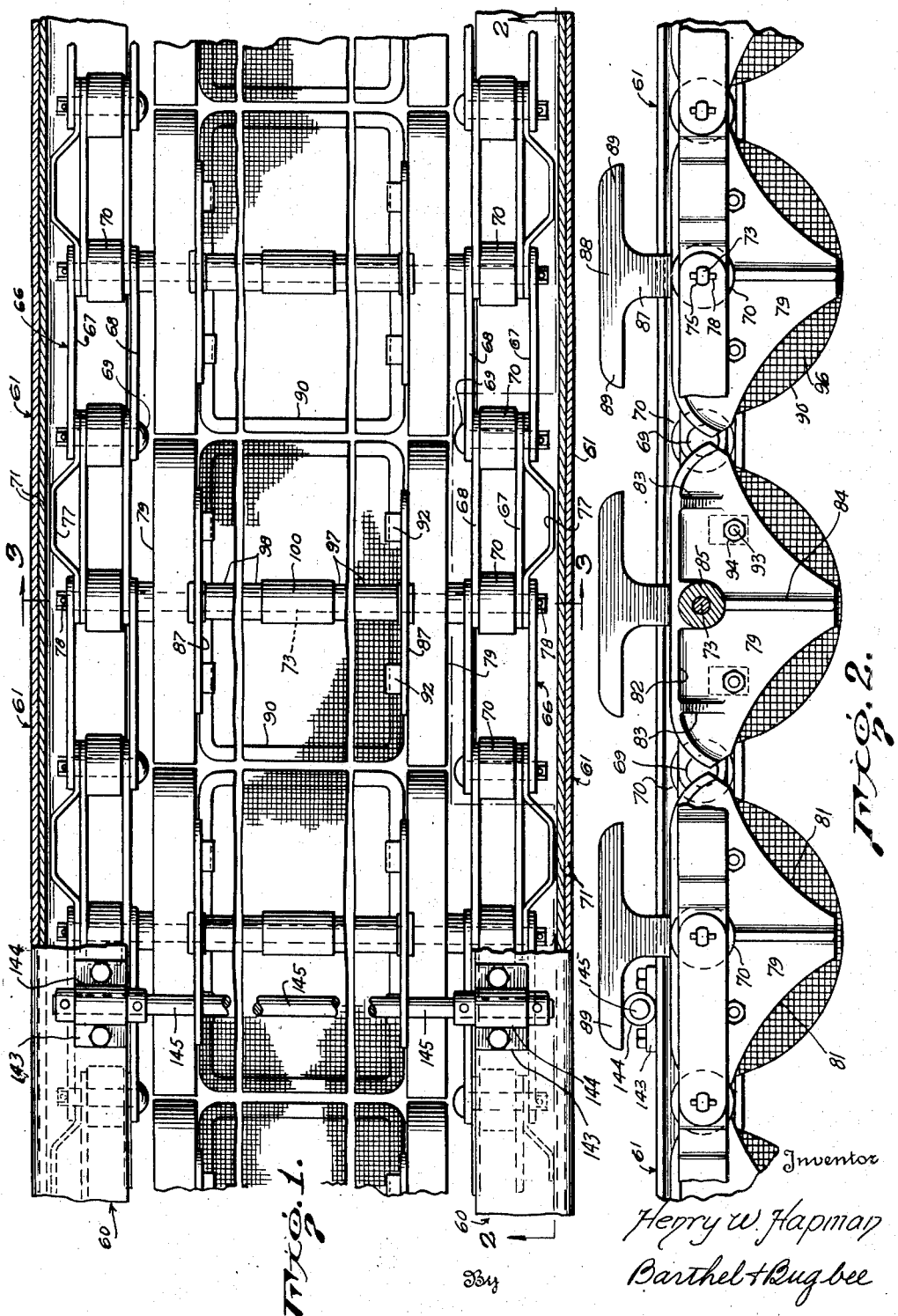
Inventor
Henry W. Hapman
By Barthel & Bugbee
Attorneys

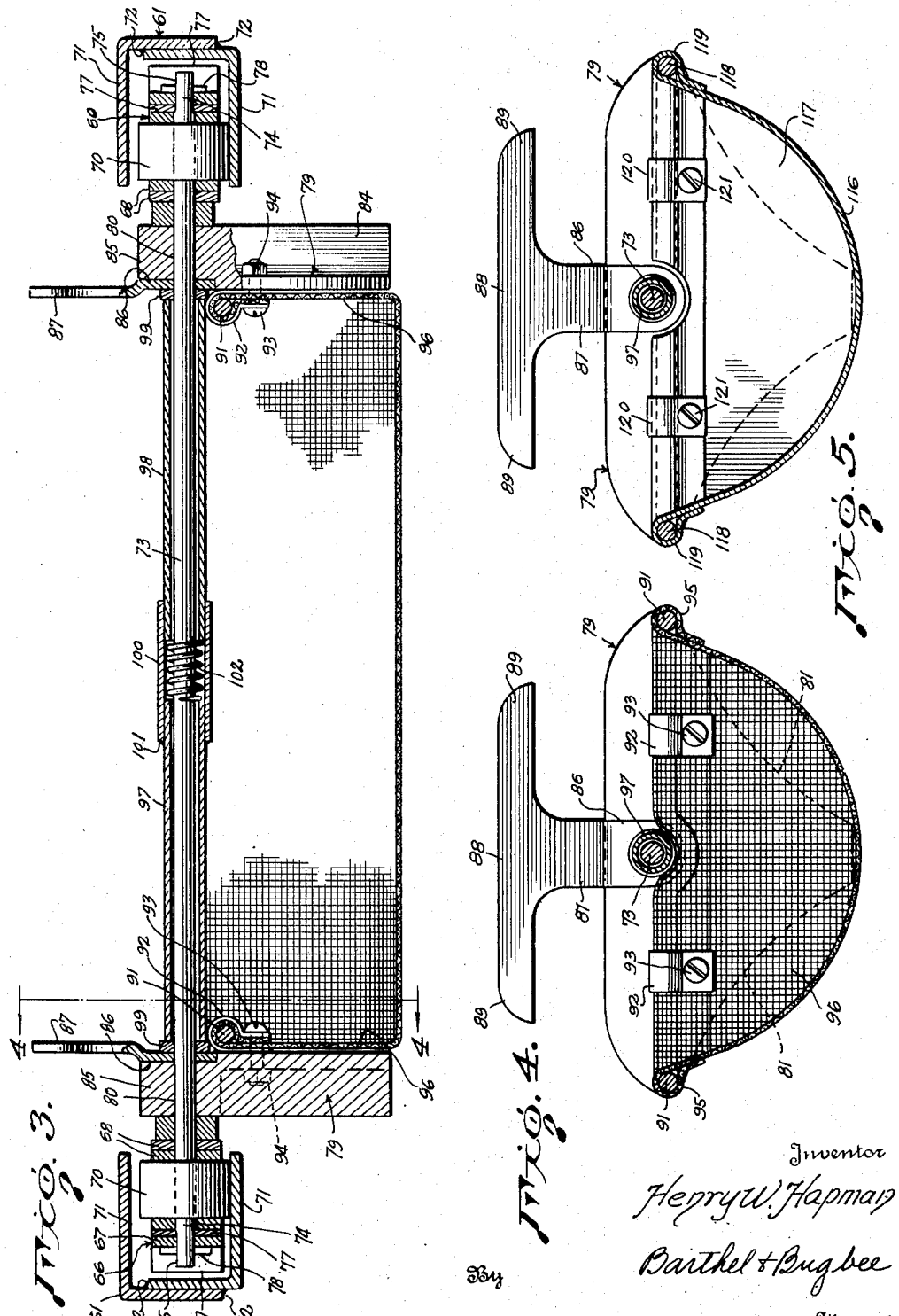

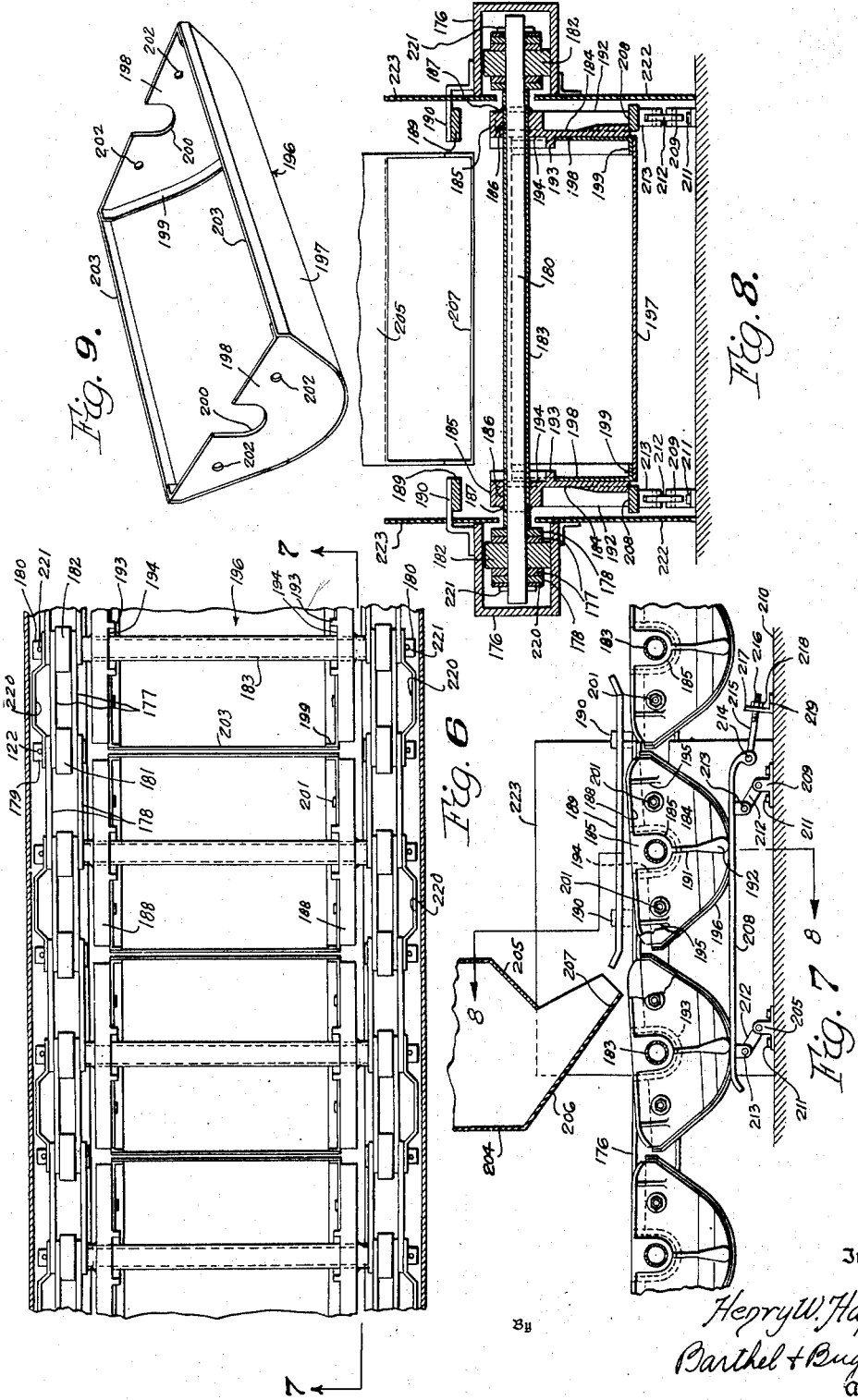

Patented May 12, 1953

2,638,205

UNITED STATES PATENT OFFICE 2,638,205

BUCKET CONVEYER

Henry W. Hapman, Detroit, Mich., assignor, by mesne assignments, of forty per cent to Hannah Jane Hapman, Detroit, Mich.

Original application March 18, 1944, Serial No. 527,036. Divided and this application July 30, 1948, Serial No. 41,511

3 Claims. (Cl. 198—150)

This invention relates to conveyors, and in particular to bucket conveyors.

One object of this invention is to provide a bucket conveyor wherein the individual buckets are provided with removable pans which are detachably secured thereto so as to permit replacement or interchanging of such pans for repair purposes or to adapt the conveyor to different conditions of use.

Another object of the invention is to provide a conveyor structure having a series of conveyor buckets which are formed of sectional units detachably connected to end members mounted adjacent the ends of a supporting rod so that said units may be removed from said end members and replaced from time to time and thereby compensate for wear and breakage.

Another object of the invention is to provide a drier and conveyor structure in which the conveyor is composed of a series of buckets supported by transverse rods connecting conveyor chains with the buckets rotatably mounted thereon in such a manner as to protect the bearing surfaces against the entrance of the material being conveyed and thereby reduce as much as possible friction and wear on the bearing surfaces of the conveyor structure.

Another object of the invention is to provide a drier of the above-mentioned type having a conveyor structure in which the buckets are pivotally suspended between a pair of spaced conveyor chains with the removable or detachable bucket units secured to spaced end plate members mounted on a tubular member which is rotatably supported on the suspension rod connecting the conveyor chains so as to eliminate material being conveyed finding its way to the bearing surfaces and to facilitate the reduction of wear on said bearing surfaces.

Another object of the invention is to provide a conveyor structure of the above-mentioned character in which a series of conveyor buckets is suspended between spaced conveyor chains with the bucket portion of the conveyor buckets formed of a piece of material secured to a rectangular frame which is removably and detachably positioned between a pair of suspended end plate members so that the bucket pan portion of the conveyor buckets may be easily removed and replaced by bucket pans formed of perforated material such as screening or the like.

This is a division of my co-pending application Serial No. 527,036, filed March 18, 1944, for Combined Drier and Conveyor Structure Therefor, which subsequently matured into U. S. Patent No. 2,476,039 of July 12, 1949.

In the drawings:

Figure 1 is an enlarged plan view of one form of the conveyor structure of the present invention with portions thereof broken away and in section to show various structural features and details of the invention;

Figure 2 is a vertical longitudinal sectional view on line 2—2 of Figure 1, looking in the direction of the arrows and illustrating the manner in which the conveyor buckets are disposed and spaced one from the other;

Figure 3 is a transverse sectional view taken on line 3—3 of Figure 1, looking in the direction of the arrows to illustrate the various structural details of one of the conveyor buckets employed in the conveyor structure;

Figure 4 is a vertical cross-sectional view taken on line 4—4 of Figure 3 further illustrating the bucket construction and the manner in which the removable bucket pan is held in place between the spaced end members;

Figure 5 is a vertical cross-sectional view similar to Figure 4 showing a solid bucket pan construction in lieu of the reticulate pan shown in Figure 4;

Figure 6 is a top plan view of a portion of a modified conveyor structure also having removable bucket pans;

Figure 7 is a longitudinal section through the conveyor structure shown in Figure 6, taken along the line 7—7 in Figure 6.

Figure 8 is a vertical section taken along the line 8—8 in Figure 7; and

Figure 9 is a perspective view of one of the removable bucket pans detached from the conveyor structure shown in Figures 6 to 8 inclusive.

Referring to the drawings in detail, Figures 1 to 5 inclusive show a portion of a conveyor structure generally designated 60 including a pair of opposed horizontal channel guide members 61 supported and braced in any suitable manner, such as in the manner shown in the Hapman application Serial No. 527,036, filed March 18, 1944, for Combined Drier and Conveyor Structure Therefor, of which the present application is a division. Mounted for travel in the channel member 60 is a pair of spaced endless conveyor chains 66 having inner and outer links 67 and 68 connected by pivot pins 69. The links 67 and 68 are spaced by means of rollers 70 which are adapted to travel in the channel guide members 61. As shown in Figure 3, the channel guide members 61 are formed of angle bars 71 welded or otherwise secured together as at 72 with one of their flanges in overlapping relation. The rollers 70 are adapted to ride and travel in said channel guide members 61 and extending between and supported by the conveyor chains 66 is a series of supporting rods 73 with their ends as at 74 projecting through alternate sets of chain links 66, 67 and 68 so as to supplement alternate pivot pins 69. The ends of the rods 73 are flattened as at 75 for receiving guide members 77 which are interposed between overlapping ends of the outer links 67 as illustrated in Figure 1. A cotter pin or key 78 is extended through an aperture in each end of the rod 73 to hold the rod and conveyor chain in spaced apart relation with the guide member 77 engaging one of the flanges of the channel-shaped guide member 61.

Rotatably mounted on the shaft 73 is a pair of end bucket-pan-supporting members 79 having openings 80 for permitting the passage of said rod 73 and each of said end members 79 is cut away as at 81 to permit air entrance at each end. Extending along the top edge of each end member 79 is flange 82 reenforced adjacent each end thereof by web portions 83 and a central rib portion 84. The area of the end plates 79 adjacent the opening 80 is reenforced by a bearing boss 85 (Figure 2). Said bearing bosses 85 are cut away as at 86 for receiving tripping arms 87 so that the inner surface of the tripping arms may be substantially flush with the inner surface of the end member 79. The free end of the tripping arm 87 may be T-shaped as at 88 to provide hooked portions at each end thereof as at 89.

Extending between and connected to spaced pairs of end plates 79 is a conveyor bucket pan formed of a wire screen member 90 having its upper edge bent over a rectangular frame 91 and held in place by U-shaped clips 92. The U-shaped clips are adapted to be held in place by bolts 93 which extend through suitable openings in the end members 79 so as to be locked in position by nuts or the like 94 threaded on opposite ends thereof. The rectangular frame 91 receives the front and rear edges of the wire mesh conveyor bucket pan 90 in substantially the same manner, and as shown in Figure 4, said edges are return bent over the longitudinal portions of the rectangular frame as at 95 with the free ends of the wire screen secured to the body portion by soldering or other fastening means. The bucket pans 90 are semi-cylindrical in shape with relatively straight end walls 96.

The end members 79 are held in spaced apart relationship by means of a pair of tubular shafts 97 and 98 (Figure 3) yieldingly urged apart so that the ends thereof will engage washer members 99 in abutting relationship with the tripping arms 87. The rod 97 is provided with a short tubular section 100 welded thereto as at 101 for telescopically receiving the inner end of the tubular section 98. A coil spring 102 encircles the shaft 73 and is mounted in the short tubular section 100 with one of its ends abutting the end of the tubular shaft 97 and its other end in abutting relationship with the tubular shaft 98. It will thus be seen that the shafts 97 and 98 will be yieldingly urged apart to create a pressure on the washer 99 and thereby seal the shaft 73 and bearing portions 80 against the entrance of material being conveyed with the elimination of considerable wear.

When it is desired to prevent leakage of material being conveyed, a solid-walled bucket pan as shown in Figure 5 is employed and said bucket pan includes a solid semi-cylindrical bottom wall 116 having solid end walls 117 connected to a rectangular wire frame 118 in substantially the same manner as the reticulate conveyor bucket pan 90. The side walls 117 are return bent at their upper ends as at 119 and said return bent portions are looped over the end portions of the rectangular portion 118 so as to be held in place by clips 120 and fastening screws 121. The end members 79 are the same as those shown in Figures 1 to 4 inclusive and the fastening screws 121 extend through the clips 120 with their free ends passing through openings in the end plate for the reception of nuts thereon. The end walls as shown in Figure 5 are cut out as at 86 for receiving the tripping arm 87 in identically the same manner as described in connection with the conveyor bucket in Figures 1 to 4 inclusive.

As shown in Figure 1, a pair of bracket plates 143 are mounted in opposed relation on the conveyor channel extension 61 and said brackets 143 are provided with tubular bosses 144 for supporting inwardly projecting tripping pins 145 which extend inwardly into the path of the tripping arm 87 affixed to each end of the conveyor buckets. Obviously, the tripping brackets 143 may be placed in any desired position.

In the modified conveyor structure shown in Figures 6 to 9 inclusive, a pair of opposed channel guide members 176 is provided. Mounted within each of the guide channel frame members 176 is a conveyor chain including inner and outer chain links 177 and 178 respectively with alternate pairs of inner and outer links connected by pivot pins 179. The other ends of the inner and outer links 177 and 178 are interconnected by the conveyor bucket supporting shaft 180 and rollers 181 and 182 are disposed on the chain pivot pins 179 and conveyor supporting shaft 180 respectively, with the rollers supported between the ends of said pairs of links. The rollers 181 and 182 are adapted to travel in the opposed channelways 176.

Rotatably mounted on each shaft 180 is a tubular shaft 183 to the ends of which is affixed a pair of bucket pan supporting end members 184. The end members 184 are provided with enlarged bearing bosses 185 having openings 186 for receiving the tubular shaft 183 so that the bearing bosses may be welded to the ends of the tubular shaft 183 as indicated by the reference character 187. The extreme ends of each tubular shaft 183 project laterally and engage the innermost outer link 178 of the conveyor chain so as to hold said chains in spaced apart relation. The end members 184 are provided along their top edges with flanges 188 for engaging a slide trackway 189 supported by the opposed channel guide 176 by means of suitable brackets 190, so as to hold the buckets against limited swinging movement of the supporting shaft 180 as illustrated in Figure 7 as the buckets traverse the loading station or filling hopper. The end members 184 to which the conveyor buckets are attached are provided with vertical ribs 191 having enlarged weighted portions 192 at the lower ends thereof to project laterally therefrom and provide tilting means for the buckets as they traverse the loading station and, if desired, tripping means for the buckets at a dumping station. The end members 184 are provided with enlarged bosses 193 (Figure 8) having recesses 194 for optionally receiving tripping arms (not shown). Reenforcing webs 195 interconnect the end members 184 with the guide ribs 188 to increase the rigidity of the end wall structure and provide a substantially solid casting. The conveyor bucket pan is illustrated in Figure 9 and indicated generally by the reference character 196, and said bucket pan includes an arcuately curved bottom wall 197 having end walls 198 secured thereto to complete the structure. The end walls 198 are provided with inwardly directed marginal flanges 199 to which the bottom wall 197 may have its ends secured as by means of welding or the like. Each of the end walls 198 of the conveyor bucket pan is cut away as at 200 to receive the enlarged boss 193 on the inner surface of the conveyor bucket end plate members 184. Machine screws or the like 201 are passed through openings 202 in the end walls 198 of the bucket pan so as to securely anchor said bucket pan 196 to the end members 184 as illustrated clearly in Figure 7. The bottom wall 197 has its free edges slightly angled as at 203 to provide an upstanding flange portion and reenforce the edge so as to prevent bending thereof.

As shown in Figure 7, a loading hopper is disposed above the conveyor buckets for the purpose of filling the same and said loading hopper is generally indicated by the reference character 204 and is provided with a short slanting bottom wall portion 205 and a staggered elongated bottom wall portion 206 thereby forming a discharge spout 207, inclined at an angle in a direction opposite to the direction of conveyor travel to permit the material being loaded to be discharged into the conveyor buckets. In order to prevent the material being discharged from overflowing the buckets, they are tilted slightly and within the limits of the guide track 189 by means of an adjustable tilting track member 208 engageable with the weighted projections 192. The tilting guide trackway 208 is located on each side of the conveyor bucket and is pivotally supported by a pair of bracket members 209 arranged in spaced relation and fastened to the floor 210 by means of bolts or the like as at 211. Pivot links 212 interconnect the brackets 209 and the tilting trackway 208 and said interconnecting links are pivoted thereto as at 213. One end of each of the tilting tracks or guideways 208 is provided with an eye 214 for pivotally receiving a screw rod 215 so that the free ends of the screw rod as at 216 may extend through a bracket 217 and be adjustably held in place by a locking nut 218. The bracket 217 is fastened to the floor 210 by its angle portion 219. It will thus be seen that the tilting trackway 208 may be raised or lowered in parallelism with the floor 210 so that the conveyor buckets entering the filling station will be tilted slightly as in Figure 7 so that one end of the guide flange 188 will be moved into sliding engagement with the slide trackway 189 at each end of the conveyor bucket.

The conveyor chains comprising the links 177 and 178 are also provided with guide shoes 220 affixed to the chain pins 179 (Figure 6) and to the ends of the conveyor supporting rods 180. Said shoes, links, rollers are held in place by cotter keys 221 extending through suitable apertures in the ends of the link pins 179 and conveyor supporting rods 180 respectively.

As illustrated in Figure 8, a pair of material confining plates 222 and 223 are disposed at each side of the loading hopper above and below the opposed channel members 176 so as to prevent the material being fed to the buckets from escaping laterally and to hold down as much as possible the dust arising from the falling of the powdered material. The lower confining plate 222 terminates a short distance short of the ends of the tubular shaft 183 and similarly, the upper confining plates 223 have their lower edges terminating a distance in close relation to said tubular shafts 183 so as to shield the opposed conveyor chains against contamination and clogging by the material being fed to the buckets.

What I claim is:

1. A bucket conveyor comprising a conveyor supporting structure, a pair of conveyor chains spacedly mounted on said structure, a bucket supporting rod extending between said conveyor chains and having its opposite ends connected thereto, a pair of bucket pan-supporting end members spacedly mounted on said rod, a rectangular frame connected between said end members, a trough-shaped bucket pan secured to and suspended from said frame, said bucket pan having opposite end walls engageable with said end members, each of said end walls of said pan having a cutaway portion extending downwardly from the upper edge thereof and spaced away from said bucket-supporting rod whereby to enable removal of said bucket pan, and fasteners detachably securing said pan to said end members.

2. A bucket conveyor comprising a conveyor supporting structure, a pair of conveyor chains spacedly mounted on said structure, a bucket supporting rod extending between said conveyor chains and having its opposite ends connected thereto, a pair of bucket pan-supporting end members spacedly mounted on said rod, a rectangular frame connected between said end members, a trough-shaped bucket pan secured to and suspended from said frame, said bucket pan having opposite end walls engageable with said end members, each of said end walls of said pan having a cutaway portion extending downwardly from the upper edge thereof and spaced away from said bucket-supporting rod whereby to enable removal of said bucket pan, and fasteners detachably securing said pan to said end members and to said frame.

3. A bucket conveyor comprising a conveyor supporting structure, a pair of conveyor chains spacedly mounted on said structure, a bucket supporting rod extending between said conveyor chains and having its opposite ends connected thereto, a pair of bucket pan-supporting end members spacedly mounted on said rod, a trough-shaped bucket pan having opposite end walls engageable with said end members, and fasteners detachably securing said pan to said end members, each of said end walls of said pan having a cutaway portion extending downwardly from the upper edge thereof and spaced away from said bucket-supporting rod whereby to enable removal of said bucket pan.

HENRY W. HAPMAN.

References Cited in the file of this patent

UNITED STATES PATENTS

| Number | Name | Date |
|---|---|---|
| 968,795 | Peck | Aug. 30, 1910 |
| 1,127,000 | Hicks | Feb. 2, 1915 |
| 1,361,821 | Briggs | Dec. 14, 1920 |
| 1,546,304 | Merwin | July 14, 1925 |

FOREIGN PATENTS

| Number | Country | Date |
|---|---|---|
| 24,518 of 1908 | Great Britain | Feb. 11, 1909 |
| 507,756 | Germany | Sept. 19, 1930 |